(12) United States Patent
Hong (10) Patent No.: US 12,530,857 B2
(45) Date of Patent: Jan. 20, 2026

(54) AUGMENTED REALITY IMPLEMENT APPARATUS AND METHOD USING MOBILE SCANNED OBJECT MODEL SCALING

(71) Applicant: Jun Pyo Hong, Seoul (KR)

(72) Inventor: Jun Pyo Hong, Seoul (KR)

( * ) Notice: Subject to any disclaimer, the term of this patent is extended or adjusted under 35 U.S.C. 154(b) by 245 days.

(21) Appl. No.: 18/248,026

(22) PCT Filed: Oct. 5, 2021

(86) PCT No.: PCT/KR2021/013583
§ 371 (c)(1),
(2) Date: Apr. 5, 2023

(87) PCT Pub. No.: WO2022/075683
PCT Pub. Date: Apr. 14, 2022

(65) Prior Publication Data
US 2023/0410451 A1 Dec. 21, 2023

(30) Foreign Application Priority Data
Oct. 5, 2020 (KR) .................. 10-2020-0128218

(51) Int. Cl.
*G06T 19/20* (2011.01)
*G06T 19/00* (2011.01)
(52) U.S. Cl.
CPC ............ *G06T 19/20* (2013.01); *G06T 19/006* (2013.01); *G06T 2200/24* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 2011/0224902 A1* | 9/2011 | Oi ...................... | G06F 16/2379 701/300 |
| 2011/0234879 A1* | 9/2011 | Kashitani ................ | G06F 3/012 348/333.02 |
| 2014/0118339 A1 | 5/2014 | Davies et al. | |

(Continued)

FOREIGN PATENT DOCUMENTS

KR 10-2012-0066233 A 6/2012
KR 10-2016-0068827 A 6/2016

*Primary Examiner* — Ryan M Gray
(74) *Attorney, Agent, or Firm* — IP & T GROUP LLP (57) ABSTRACT

Disclosed are a method and device for realizing augmented reality via mobile scan object model scaling. According to one embodiment of the present invention, an augmented reality realization method performed in an augmented reality realization device via mobile scan object modeling may comprise the steps of: capturing a background image by means of an image-capturing unit; displaying the background image in real time via a display unit, and creating, by means of an AR drive unit, an AR space corresponding to the background image according to an augmented reality start command from a user; loading an object model selected by the user onto the AR space; matching a model coordinate system of the object model with an AR coordinate system of the AR space; scaling the object model according to a result of the matching; and overlaying the scaled object model onto the AR space, and displaying same.

9 Claims, 6 Drawing Sheets

(56) References Cited

U.S. PATENT DOCUMENTS

| | | | |
|---|---|---|---|
| 2014/0123507 A1* | 5/2014 | Gupta | G06T 7/70 |
| | | | 33/1 M |
| 2014/0270477 A1* | 9/2014 | Coon | G01C 11/04 |
| | | | 382/154 |
| 2014/0282220 A1 | 9/2014 | Wantland et al. | |
| 2017/0154471 A1* | 6/2017 | Woo | G06F 3/011 |
| 2018/0286065 A1* | 10/2018 | Knorr | G06T 7/73 |
| 2020/0279396 A1 | 9/2020 | Komissarov et al. | |
| 2021/0209777 A1* | 7/2021 | Zhao | H04N 21/234 |
| 2021/0406575 A1* | 12/2021 | Wiggeshoff | G06T 19/006 |
| 2023/0119162 A1* | 4/2023 | Lipton | H04N 23/635 |
| | | | 345/633 |

\* cited by examiner

(a) AR coordinate system          (b) Model coordinate system

AUGMENTED REALITY IMPLEMENT APPARATUS AND METHOD USING MOBILE SCANNED OBJECT MODEL SCALING

This application is a national stage application of PCT/KR2021/013583 filed on Oct. 5, 2021, which claims priorities of Korean patent application number 10-2020-0128218 filed on Oct. 5, 2020. The disclosure of each of the foregoing applications is incorporated herein by reference in its entirety.

FIELD

The present invention relates to augmented reality (AR) technology, more specifically, relates to apparatus and method for implementing augmented reality by scaling an object model generated by image scanning using a mobile device to fit the actual size and implementing realistic augmented reality through the scaled object model.

RELATED ARTS 3D scanning refers to a technique of generating a 3D model representing a 3D shape of an object using an image sensor. 3D scanning methods include a manual method in which a person holds a scanner and adjusts its position to scan various parts of an object, and an automatic method in which a scanner or an object is automatically adjusted in position by a robot to scan various parts of an object.

A 3D object model may be generated using scan data obtained through the 3D scanning. At this time, although the relative size of each component constituting the 3D object model can be known, it is difficult to identify the actual size of the object model.

In order to identify the actual size, it is necessary to measure the distance between the scanner and the object through a different method by using special equipment such as a 3D scanner. Alternatively, there is an inconvenience in that the size of the object must be indirectly confirmed by photographing a separate marker (or grid) for knowing the actual length around the object.

SUMMARY

Technical Objects

The present invention may provide apparatus and method of implementing augmented reality using mobile scanned object model scaling, which can create a 3D object model for an object using a camera provided in a general portable terminal possessed by a user and implement a corresponding three-dimensional object model in augmented reality in the same size as the actual size without using a 3D scanner or taking a shoot with a separate marker (or grid) to provide realistic augmented reality to users.

Other advantages and objectives will be easily appreciated through description below.

Technical Solutions

According to one aspect of the present invention, there is provided a method of implementing an augmented reality performed on an apparatus of implementing the augmented reality using a mobile scanned object model, including capturing a background image by an image capturing unit; when the background image is displayed on a display in real-time, generating an augmented reality space corresponding to the background image by an AR running unit according to an augmented reality start command from a user; loading an object model selected by the user within the augmented reality space; matching an augmented reality coordinate system for the augmented reality space with a model coordinate system for the object model; scaling the object model according to the matching result; and displaying the scaled object model overlappingly within the augmented reality space.

The matching the augmented reality coordinate system with the model coordinate system may include estimating a plurality of first camera locations in the augmented reality coordinate system; estimating a plurality of second camera locations corresponding to the plurality of first camera locations in the model coordinate system; and calculating a scale factor for the model coordinate system to match the plurality of first camera locations with the plurality of second camera locations, wherein the object model is scaled by applying the scale factor in the scaling the object model.

The calculating the scale factor may be calculating a ratio of a first unit length between the plurality of first cameral locations and a second unit length between the plurality of second cameral locations as the scale factor.

The calculating the scale factor may include calculating a ratio of a length between two among the plurality of first cameral locations and a length between two among the plurality of second cameral locations as partial scale factors; and analyzing a numerical distribution of the partial scale factors and setting an average of a cluster having the largest distribution as the scale factor.

The first camera location may be estimated by SLAM (Simultaneous Localization and Mapping).

The object model that is a mobile scanned object model being scanned by a camera provided in a mobile device may be a 3D model that is generated by a photogrammetry with a plurality of 2D images captured by the camera.

According to another aspect of the present invention, there is provided an apparatus of implementing an augmented reality using a mobile scanned object model, including: an image capturing unit, configured for capturing an image that is a background to implement the augmented reality; a display unit, configured for displaying the image captured by the image capturing unit on a screen in real-time; an augmented reality running unit, configured for running the image as an augmented reality space according to a user input and loading an object module selected by a user within the augmented reality space; and a controller, configured for controlling operation of the image capturing unit, the display, and the augmented reality running unit, wherein the object model is a mobile scanned object model that is scanned by a camera provided in a mobile device.

The augmented reality running unit may include an augmented reality core unit, configured for managing an augmented reality coordinate system for the augmented reality space; and a coordinate matching unit, configured for matching a model coordinate system that is included in the object model with the augmented reality coordinate system to scale the object model to correspond to the augmented reality space.

The coordinate matching unit may estimate a plurality of first camera locations in the augmented reality coordinate system, estimate a plurality of second camera locations corresponding to the plurality of first camera locations in the model coordinate system, calculate a scale factor for the model coordinate system to match the plurality of first camera locations with the plurality of second camera locations, and then scale the object model by applying the scale factor to the object model.

The coordinate matching unit may calculate a ratio of a first unit length between the plurality of first camera locations and a second unit length between the plurality of second cameral locations as the scale factor.

The coordinate matching unit may calculate a ratio of a length between two among the plurality of first cameral locations and a length between two among the plurality of second cameral locations as partial scale factors, analyze a numerical distribution of the partial scale factors, and set an average of a cluster having the largest distribution as the scale factor.

The first camera location may be estimated by SLAM.

Any other aspects, features, and advantages will be more clearly understood from the following detailed description taken in conjunction with the accompanying drawings and claims.

Effects of Invention

According to embodiment of the present invention, it is advantageous to provide realistic augmented reality to users by creating a 3D object model for an object using a camera provided in a general portable terminal possessed by a user and implementing a corresponding three-dimensional object model in augmented reality in the same size as the actual size without using a 3D scanner or taking a shoot with a separate marker (or grid).

DETAILED DESCRIPTION

The invention can be modified in various forms and specific embodiments will be described below and illustrated with accompanying drawings. However, the embodiments are not intended to limit the invention, but it should be understood that the invention includes all modifications, equivalents, and replacements belonging to the concept and the technical scope of the invention.

If it is mentioned that an element is "connected to" or "coupled to" another element, it should be understood that still another element may be interposed therebetween, as well as that the element may be connected or coupled directly to another element. On the contrary, if it is mentioned that an element is "connected directly to" or "coupled directly to" another element, it should be understood that still another element is not interposed therebetween.

Terms such as first, second, etc., may be used to refer to various elements, but, these element should not be limited due to these terms. These terms will be used to distinguish one element from another element.

The terms used in the following description are intended to merely describe specific embodiments, but not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should thus be understood that the possibility of existence or addition of one or more other different features, numbers, steps, operations, elements, components, or combinations thereof is not excluded.

Elements of an embodiment described below with reference to the accompanying drawings are not limited to the corresponding embodiment, may be included in another embodiment without departing from the technical spirit of the invention. Although particular description is not made, plural embodiments may be embodied as one embodiment.

In describing the invention with reference to the accompanying drawings, like elements are referenced by like reference numerals or signs regardless of the drawing numbers and description thereof is not repeated. The invention can be modified in various forms and specific embodiments will be described below and illustrated with accompanying drawings. However, the embodiments are not intended to limit the invention, but it should be understood that the invention includes all modifications, equivalents, and replacements belonging to the concept and the technical scope of the invention.

If it is mentioned that an element is "connected to" or "coupled to" another element, it should be understood that still another element may be interposed therebetween, as well as that the element may be connected or coupled directly to another element. On the contrary, if it is mentioned that an element is "connected directly to" or "coupled directly to" another element, it should be understood that still another element is not interposed therebetween.

Terms such as first, second, etc., may be used to refer to various elements, but, these element should not be limited due to these terms. These terms will be used to distinguish one element from another element.

The terms used in the following description are intended to merely describe specific embodiments, but not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should thus be understood that the possibility of existence or addition of one or more other different features, numbers, steps, operations, elements, components, or combinations thereof is not excluded.

Elements of an embodiment described below with reference to the accompanying drawings are not limited to the corresponding embodiment, may be included in another embodiment without departing from the technical spirit of the invention. Although particular description is not made, plural embodiments may be embodied as one embodiment.

In describing the invention with reference to the accompanying drawings, like elements are referenced by like reference numerals or signs regardless of the drawing numbers and description thereof is not repeated. If it is determined that detailed description of known techniques involved in the invention makes the gist of the invention obscure, the detailed description thereof will not be made.

Terms such as ~part, ~unit, ~module mean an element configured for performing a function or an operation. This can be implemented in hardware, software or combination thereof.

Figure 1:
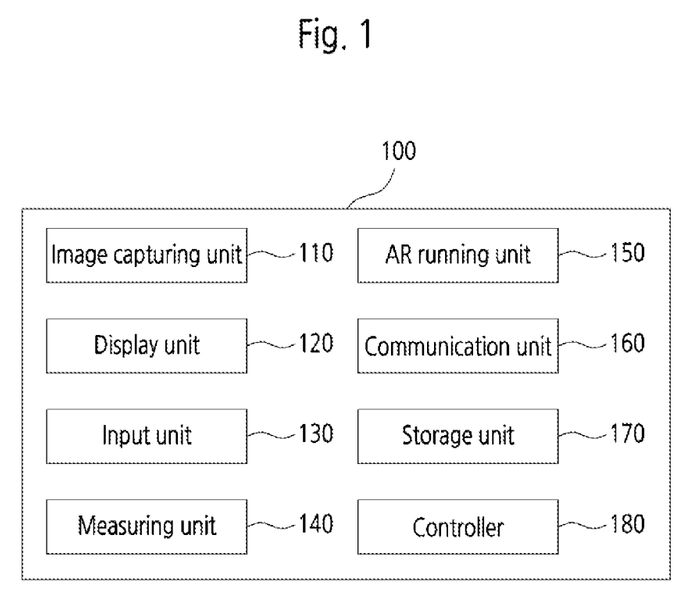
FIG. 1 is a block diagram of apparatus implementing augmented reality using mobile scanned object model scaling according to one embodiment of the present invention.
Figure 2:
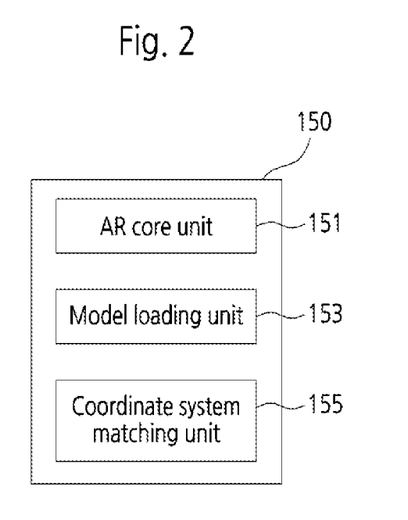
FIG. 2 is a block diagram of AR operating unit according to one embodiment of the present invention.
Figure 3:
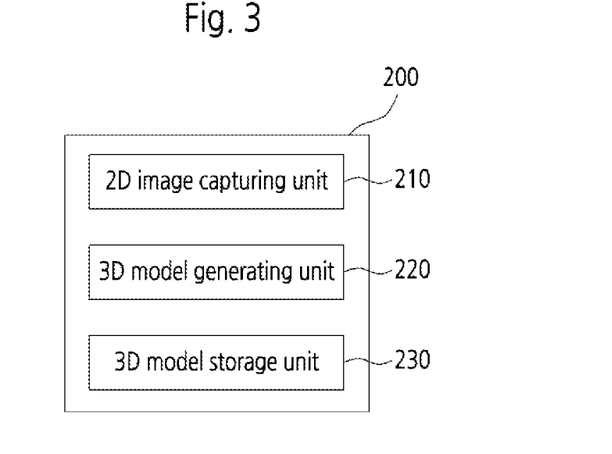
FIG. 3 is a block diagram of apparatus of modeling mobile scanned object.
Figure 4:
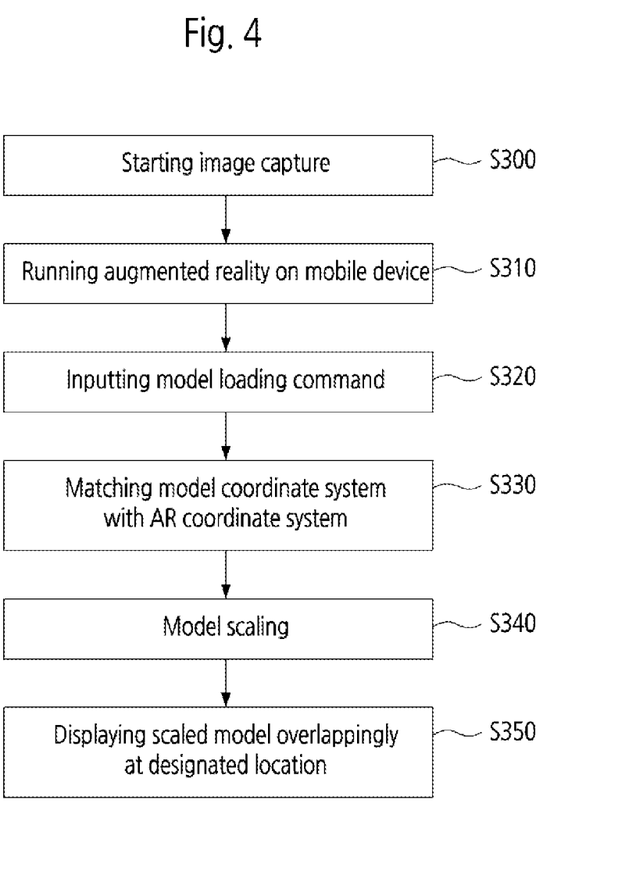
FIG. 4 is a flowchart of method of implementing augmented reality using mobile scanned object model scaling according to one embodiment of the present invention.
Figure 5:
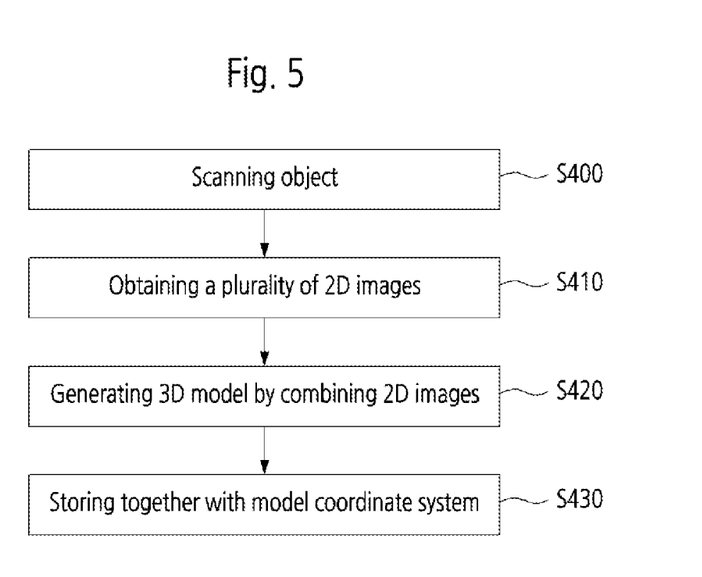
FIG. 5 is a flowchart of method of modeling mobile scanned object according to one embodiment of the present invention.
Figure 6:
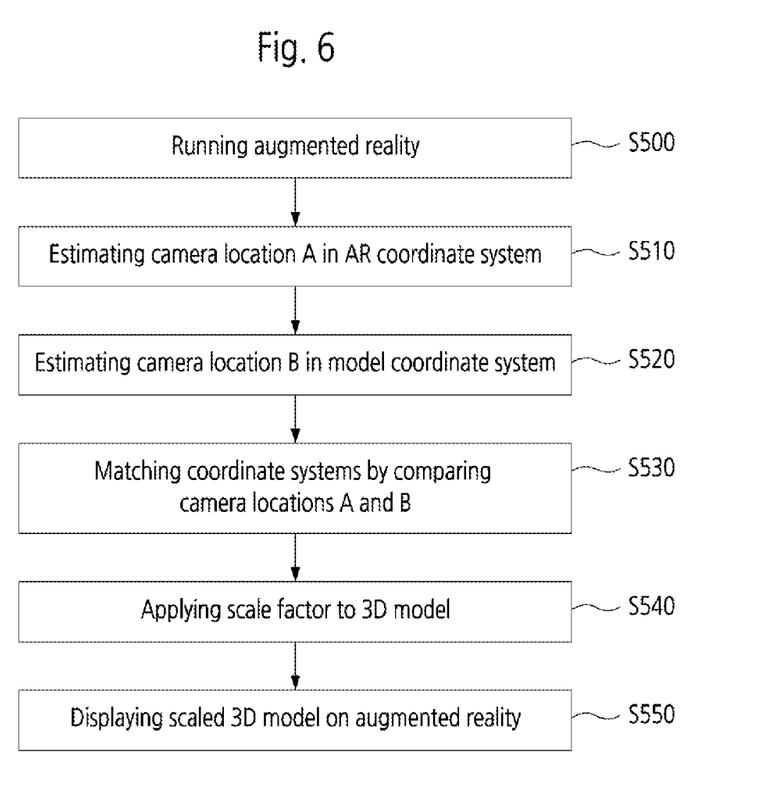
FIG. 6 is a detailed flowchart of method of modeling mobile scanned object.
Figure 7:
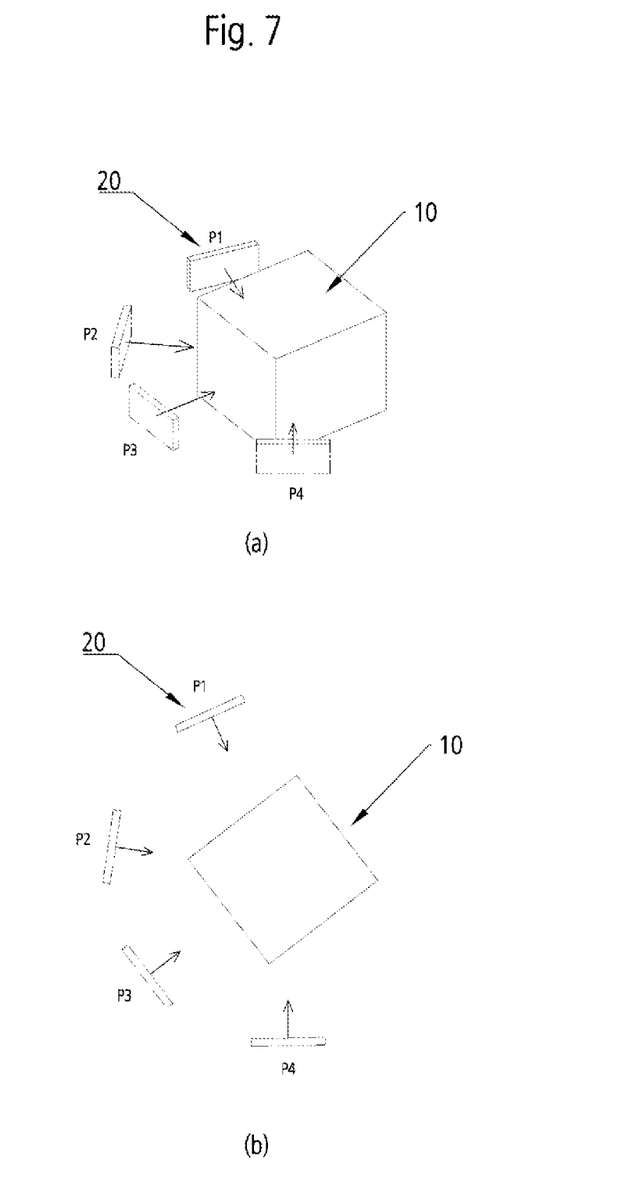
FIG. 7 and FIG. 8 illustrate method of modeling mobile scanned object.
Figure 8:
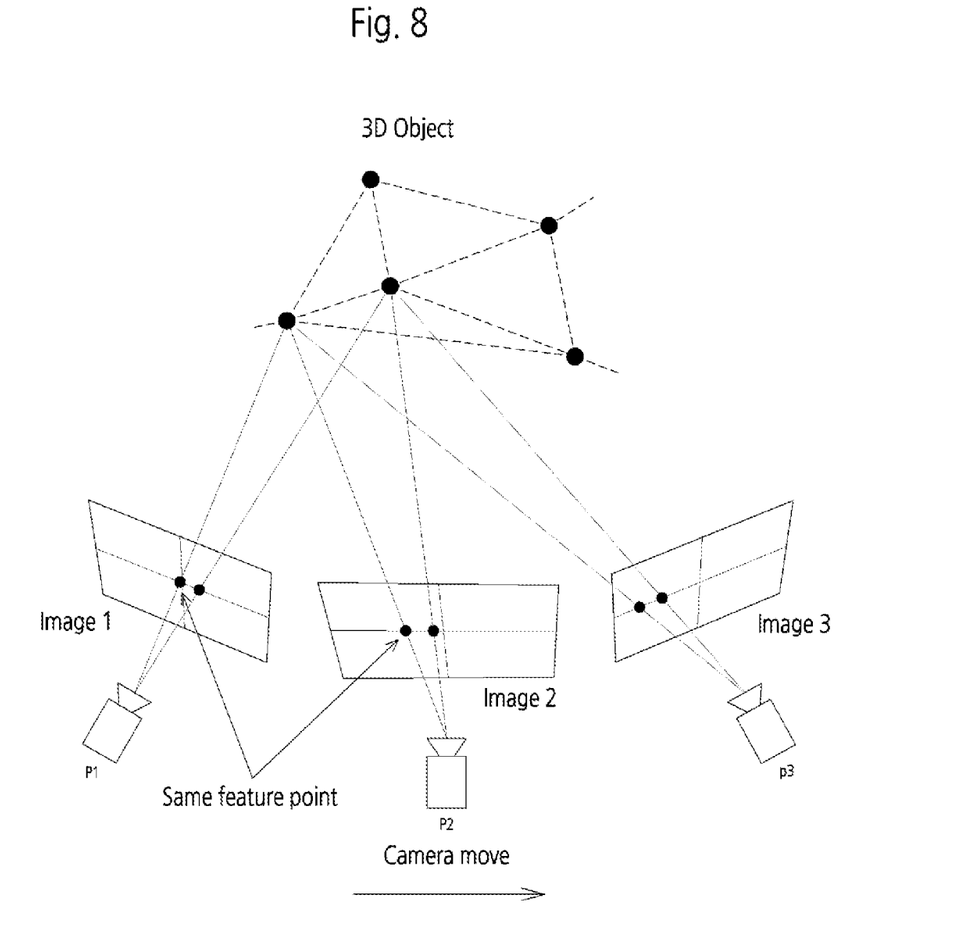
Figure 9:
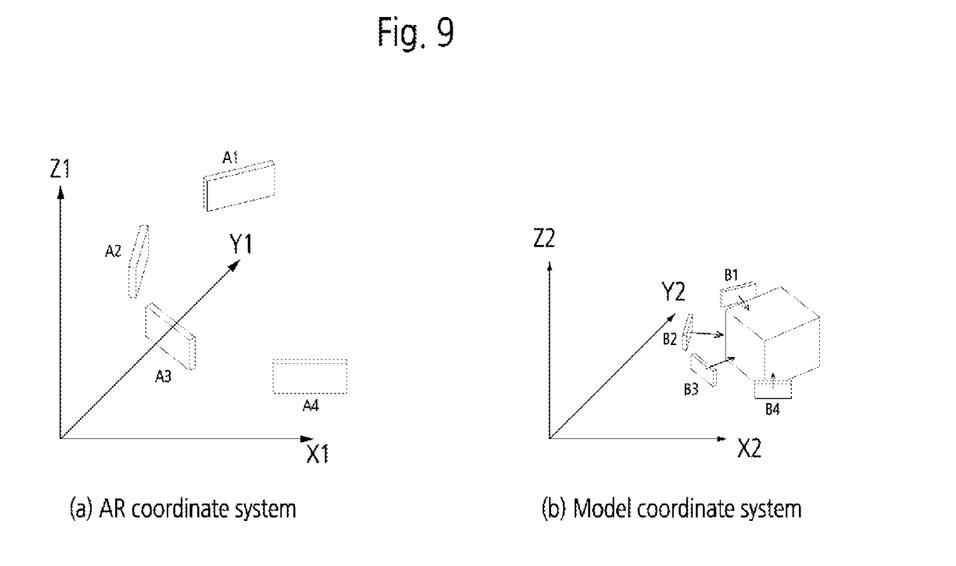
FIG. 9 illustrates AR coordinates and model coordinates.

FIG. 1 is a block diagram of apparatus implementing an augmented reality using mobile scanned object model scaling according to one embodiment of the present invention, FIG. 2 is a block diagram of AR operating unit according to one embodiment of the present invention, FIG. 3 is a block diagram of apparatus of modeling mobile scanned object, FIG. 4 is a flowchart of method of implementing the augmented reality using mobile scanned object model scaling according to one embodiment of the present invention, FIG. 5 is a flowchart of method of modeling mobile scanned object according to one embodiment of the present invention, FIG. 6 is a detailed flowchart of method of modeling mobile scanned object, FIG. 7 and FIG. 8 illustrate method of modeling mobile scanned object, and FIG. 9 illustrates AR coordinates and model coordinates.

The apparatus and method of implementing the augmented reality using mobile scanned object model scaling according to one embodiment of the present invention can display the 3D model (object model, point cloud model) that is captured and modeled by a camera on a general mobile device (e.g., smartphone, tablet PC and so on) of a user without a special-purpose 3D scanner or marker (or grid) and has no absolute size information (it will be referred as mobile scan) by scaling it to match the actual size on the currently running the augmented reality, thereby providing a user with a sense of reality like a real object by using a virtual object.

Referring to FIG. 1, the apparatus 100 of implementing the augmented reality using a mobile scanned object model scaling according to the present embodiment may be implemented as a portable terminal such as a smart phone or a tablet PC. However, the apparatus 100 will not be limited thereto. The apparatus 100 may be implemented as a separate device for performing the method of implementing the augmented reality using a mobile scanned object model scaling according to one embodiment of the present invention.

The apparatus 100 of implementing the augmented reality using a mobile scanned object model scaling may include an image capturing unit 110, a display unit 120, an input unit 130, a measuring unit 140, an augmented reality (AR) running unit 150, a communication unit 160, a storage unit 170 and a controller 180.

The image capturing unit 110 may capture an image of a place that is a background to implement the augmented reality. The image capturing unit 110 may include one or more of various types of cameras such as a CCD camera, a CMOS camera, and an infrared camera.

The display unit 120 may represent image captured by the image capturing unit 110 on a screen. The display unit 120 may be implemented with various types of display devices such as LCD and OLED.

The input unit 130 may receive a user command for controlling the operation of the apparatus. The input unit 130 may be implemented as a touch screen, a button, or a switch.

The user command may include an augmented reality start command, a model loading command, a model movement command, a model rotation command, and the like. The augmented reality start command may be a command to cause the image capturing unit 110 to capture an image of a place where the augmented reality is to be implemented in or to run the augmented reality during image capturing. The model loading command may be a command to load and display a virtual 3D model (object model) on an image (background image) that is captured by the image capturing unit 110 and displayed through the display unit 120. When loading the model, a model scaling may be performed by matching a model coordinate system and an AR coordinate system and applying a scale factor determined according to the matching, so that the object model having an actual size corresponding to a 3D space of the background image can be loaded. The model movement command may be a command for moving the object model to another location within the 3D space of the background image while the object model is being displayed at an arbitrary (or a designated) location. The model rotation command may be a command that rotates the object model while the object model is being displayed.

Also, the input unit 130 may receive a selection of the object model to be loaded into the 3D space within the background image to implement the augmented reality from a user. A list of object model(s) modeled by an apparatus 200 of modeling mobile scanned object, which will be described later, may be provided to the user through the screen of the display unit 120, and the user may select the object model desired to be loaded through the input unit 130.

The measuring unit 140 may measure locations, directions, postures and so on of the apparatus 100.

The measuring unit 140 may include one or more of a location measurement module, a direction measurement module, and a posture measurement module.

The location measurement module may measure the location of the apparatus 100. For example, one or more of a GPS receiver that detects a current location by receiving GPS satellite signals, or an indoor wireless signal receiver that detects the current location by receiving signals such as WIFI base stations or beacons in shaded areas or indoors where GPS satellite signals cannot be received may be included in the location measurement module.

The direction measurement module may measure a direction (e.g., azimuth) taken by the image capturing unit 110 of the apparatus 100. For example, a gyroscope sensor, a 3-axis acceleration sensor, and the like may be included in the direction measurement module.

The posture measurement module may measure the posture (e.g., tilting angle) of the apparatus 100. For example, a tilting sensor may be included in the posture measurement module.

When the direction data and the posture data are combined, a pitch angle, a yaw angle, and a roll angle of the image capturing unit 110 may be calculated, thereby being possible to accurately identify a portion being captured by the image capturing unit 110 within the 3D space where the apparatus 100 is located.

In response to a user input from the input unit 130, the AR running unit 150 may load and cause the virtual object model to be displayed in the 3D space in the background image captured by the image capturing unit 110 of the apparatus 100 and displayed through the display unit 120. The virtual object model desired by the user is loaded and displayed. The AR running unit 150 will be described in detail later with reference to related drawings.

The communication unit 160 may enable a communication connection with an external server or database through a network. The external server or database may store object models created by the apparatus 200 of modeling mobile scanned object, object models scanned by the 3D scanner, or object models designed by a modeling program. The communication unit 160 may request and receive a desired object model according to a loading request from the AR running unit 150.

The storage unit 170 may store a program required to perform the method of implementing the augmented reality using a mobile scanned object model scaling and data generated during execution of the program. In addition, an operating program of the apparatus 100 may be stored thereon.

The controller 180 may control the operation of each element of the apparatus 100. The controller 180 may execute the program stored in the storage unit 170 and control any one or more of the image capturing unit 110, the display unit 120, the input unit 130, the measuring unit 140, the AR running unit 150, the communication unit 160, and the storage unit 170.

Referring to FIG. 2, a detailed configuration of the AR running unit 150 is illustrated. The AR running unit 150 may include an AR core unit 151, a model loading unit 153, and a coordinate system matching unit 155.

The AR core unit 151 may set the AR coordinate system for the 3D space in the background image and manage the augmented reality implemented in the AR coordinate system as a whole.

Arbitrary coordinates (or preset coordinates) can be set as the origin in the 3D space that is the background of augmented reality implementation, and the AR coordinate system can be set by the X, Y, and Z axes orthogonal to each other (see (a) of FIG. 9).

The actual size of the background image displayed through the display unit 120 may be reflected in the AR coordinate system. That is, the AR core unit 151 may estimate a camera location A corresponding to the image capturing unit 110 based on the AR coordinate system.

In this case, SLAM (Simultaneous Localization and Mapping) algorithm may be applied to camera location estimation. According to the SLAM algorithm, it is possible to recognize one's own location in the 3D space and generate 3D data of the space at the same time.

A distance sensor or a vision sensor may be used to apply the SLAM algorithm. The distance sensor may be a sensor that analyzes distance using ultrasound, laser, or sonar. In this embodiment, the apparatus 100 may additionally include a distance sensor (not shown) to apply the SLAM algorithm in the AR running unit 150. The vision sensor may be a camera sensor and interpret images obtained from the camera. Therefore, in this embodiment, the image capturing unit 110 may be used as the vision sensor.

Regarding an occurrence of error due to the use of a sensor, a probability technique such as a Kalman-Filter, a Particle filter, or a Graph technique may be used to calibrate the error.

In the case of the SLAM algorithm, the following steps can be performed sequentially.

First, MSHC (Multi-Scale Harris corner) feature points and SIFT feature points corresponding to common points that are invariant even by the location or rotation of the camera may be extracted. It may be provided in the form of a library used in the field of image processing, and when an image is inputted, the position and value of the feature points can be automatically outputted.

In addition, an object may be recognized through the RANSAC (Random Sample Consensus) technique. In order to estimate the correlation between the extracted feature points, it is necessary to perform various calculations on the location and distance of each feature point. However, when the number of feature points increases, an enormous amount of computation time is required to analyze the correlation between each feature point. Therefore, in order to perform fast calculations, it is necessary to calculate only a certain number of times for two randomly designated feature points, and this is the RANSAC technique.

And when object recognition is performed, accurate distance information to the center point of the recognized object may be obtained. For example, the center point of the object may be the center point of the nearest surface.

The model loading unit 153 may load an object model desired by a user from the external server or database into the 3D space (Augmented reality space) within the background image managed by the AR core unit 151.

In this embodiment, an object model to be loaded is a 3D model modeled by the apparatus 200 of modeling mobile scanned object. 3D reconstruction, which obtains a 3D modeling image through merging of 2D images, may be applied to the modeling of the object model.

Referring to FIG. 3, the apparatus 200 of modeling mobile scanned object may be implemented as the portable terminal such as the smart phone or the tablet PC. However, the apparatus 200 will not be limited thereto. The apparatus 200 may be implemented as a separate device for performing the method of modeling mobile scanned object according to the present embodiment.

The apparatus 200 may include a 2D image capturing unit 210, a 3D model generating unit 220, and a 3D model storage unit 230.

Referring to FIGS. 5 and 7, when object scanning starts (step S400), the 2D image capturing unit 210 may capture a plurality of 2D images in front, back, top and bottom, and left and right directions of the object 10 to be modeled (step S410). The 2D image capturing unit 210 may be a built-in camera 20 in the portable terminal. That is, since a camera of a portable terminal, which is a general mobile device, is used, it may correspond to the mobile scan method.

The 3D model generating unit 220 may generate a 3D model by combining the plurality of 2D images (step S420).

Referring to FIG. 8, when the camera moves in the order of P1, P2, and P3, a plurality of 2D images corresponding to image 1, image 2, and image 3 are acquired at each location. The same feature point corresponding to the same point of the object 10 may exist in the plurality of 2D images. Accordingly, a virtual 3D object model may be created by matching the same feature points.

The photogrammetry is an advanced technique from SfM (Structure from Motion) that extracts feature points using pixel information of each image in the 3D space and estimates the location of a camera using a triangulation technique. In this case, feature points of each image are generated using a Scale-Invariant Feature Transform (SIFT) algorithm. SIFT is an algorithm that extracts features that are invariant to the size and rotation of an image.

After extracting SIFT feature points from two different 2D images, and then matching the feature points that are most similar to each other, matching parts can be found in the two 2D images.

The 3D model storage unit 230 may store the object model generated by the 3D model generating unit 220 in correspondence with the model coordinate system matched to the location information captured by the 2D image capture unit 210 (step S430). That is, the object model modeled by the mobile scan method may include the model coordinate system that includes or estimates the location information of the camera that has captured the object model. Accordingly, when the object model is loaded, the corresponding model coordinate system may be loaded together.

The object model created in the present embodiment is a combination of the plurality of 2D images, and the surface texture of the target object obtained from the plurality of 2D images may be also reflected on the surface of the 3D object model. Therefore, although it is a virtual object model, it can provide a high sense of reality to the user by showing the same surface texture as the real one. This is a differentiated part from modeling a 3D model based on design data, which is forced to give a virtual feeling by selecting from artificially set texture data when expressing the surface.

In the present embodiment, when a target object is 3D scanned using the mobile scan method, the size of the object model may be determined relative to the camera. However, information about the absolute size of the object model may not be included.

Referring back to FIG. 2, when a mobile scanned object model is loaded by the model loading unit 153, the coordinate system matching unit 155 may cause the object model to be overlappingly displayed in the 3D space within the background image. In this case, it is necessary to display the object model in the background image so as to correspond to the actual size.

Therefore, the coordinate system matching unit 155 matches the AR coordinate system generated by the AR core unit 151 (see (a) in FIG. 9) with the model coordinate system for the object model (see (b) in FIG. 9).

The AR coordinate system is a coordinate system related to a 3-dimensional space (Augmented reality space) of the background image to implement the augmented reality, and is obtained by the AR core unit 151. Since it corresponds to a main space implementing the augmented reality, the AR coordinate system becomes a main coordinate system. In the AR coordinate system, the location of the image capturing unit 110 corresponding to the current augmented reality space, that is, the camera location A may be estimated.

The model coordinate system is a coordinate system created according to the locational correlation between the camera and the target object when the object model is created using the mobile scan method. In the case of the model coordinate system, when a corresponding object model is displayed through the display unit 120, a camera location B for displaying the corresponding object model as such can be estimated.

When the camera location A in the AR coordinate system and the camera location B in the model coordinate system are matched, the coordinate system becomes matched, and the object model can be scaled to a size corresponding to the AR coordinate system and displayed in the augmented reality space.

Camera location $A(A_1 \sim A_n)$ and camera location $B(B_1 \sim B_n)$ are states in which the same camera location is expressed in different coordinate systems (AR coordinate system and model coordinate system).

Therefore, the ratio of the distance between arbitrary two camera locations (first unit length) in the AR coordinate system and the distance between the corresponding two camera locations (second unit length) in the model coordinate system may be calculated as partial scale factors $S_1 \sim S_{n-1}$.

$S_1=(A_2-A_1)/(B_2-B_1), S_2=(A_3-A_2)/(B_3-B_2), \ldots, S_{n-1}=(A_n-A_{n-1})/(B_n-B_{n-1})$ Here, since the camera location B estimated in the model coordinate system may include an error due to a sensor, partial scale factors $S_1 \sim S_{n-1}$ may not have the same value. Therefore, a scale factor between the two coordinate systems can be estimated by obtaining a numerical distribution of the partial scale factors $S_1 \sim S_{n-1}$ and obtaining an average of a cluster having the largest distribution. This is a process of excluding parts judged as outliers by error.

If the scale factor S is estimated, when displaying the object model in the augmented reality space, the scale factor S may be applied to scale up or down the object model so that the scaled object model may be displayed in the augmented reality space.

In this case, the object model displayed in the augmented reality space is scaled to fit the size of the AR space, so that the target object can be displayed as if it were actually placed in the corresponding space.

Referring to FIG. 4, the method of implementing the augmented reality performed by the apparatus 100 according to the present embodiment is shown.

The image capturing unit 110 of the apparatus 100, which is a mobile device, may start capturing an image of a space in which the augmented reality is to be implemented according to a user command (step S300).

When a background image is displayed in real time through the display unit 120, when an augmented reality start command is input at a point to implement the augmented reality, the augmented reality starts through the AR running unit 150 (step S310).

When the AR space is set by the AR core unit 151, a model loading command to overlappingly display a desired object model within the augmented reality space may be input through the input unit 130 (step S320).

Corresponding to the model loading command, the model loading unit 153 may load the object model. However, since the object model in the present embodiment is modeled by the mobile scan method, information about the actual size is missing.

Therefore, the coordinate system matching unit 155 may perform an operation of matching the model coordinate system with the AR coordinate system (step S330). Coordinate system matching is a process of matching the camera location A on the AR coordinate system with the camera location B on the model coordinate system.

In the state where the augmented reality is running (step S500), the camera location A on the AR coordinate system may be estimated (step S510), and the camera location B on the model coordinate system may be estimated (step S520). Then, the coordinate system matching may be performed by comparing camera locations A and B (step S530).

A partial scale factor that is the ratio of the distance between arbitrary two camera locations in the AR coordinate system to the distance between the corresponding two camera locations in the model coordinate system may be the scale factor. However, since sensor errors may be included among the two camera locations, it is possible to estimate the scale factor between the two coordinate systems by calculating the plurality of partial scale factors, analyzing the numerical distribution, and obtaining the average of the cluster having the largest distribution.

If the scale factor is estimated, scaling may be performed on the object model (steps S340 and S540). That is, a scale factor may be applied to the 3D object model.

The scaled object model may be overlappingly displayed at a designated location in the augmented reality space (steps S350 and S550). A location where the object model is overlapped and displayed in the augmented reality space may be marked with a specific marker in the real space. Alternatively, an arbitrary location in the augmented reality space selected through a user input may be set as a location to be overlapped with the object model.

The above-described method of modeling a mobile scanned object and method of implementing the augmented reality using the mobile scanned object model may also be implemented in the form of a non-transitory recording medium including instructions executable by a computer, such as an application or program module executed by a computer. Non-transitory computer-readable medium can be any available media that can be accessed by a computer and includes both volatile and nonvolatile medium, removable and non-removable media. In addition, non-transitory computer-readable medium may include computer storage medium. Computer storage medium includes both volatile and nonvolatile, removable and non-removable media implemented in any method or technology for storage of information such as computer readable instructions, data structures, program modules or other data.

The above-described method of modeling a mobile scanned object and method of implementing the augmented reality using the mobile scanned object model may be executed by an application (which may include a program included in a platform or operating system by default installed in the terminal) installed by default in the terminal, and by an application (i.e., program) that a user manually installed in the terminal after downloading from an application store server, or an application providing server such as a web server related to the application or service. In this sense, the above-described method of modeling a mobile scanned object and method of implementing the augmented reality using the mobile scanned object model may be implemented as an application (i.e., program) installed by default in the terminal or manually installed by a user, and may be recorded in the non-transitory computer-readable recording medium such as the terminal.

While the invention has been described above with reference to exemplary embodiments, it will be understood by those skilled in the art that the invention can be modified and changed in various forms without departing from the concept and scope of the invention described in the appended claims.

What is claimed is:

1. A method of implementing an augmented reality performed on an apparatus of implementing the augmented reality using a mobile scanned object model, the method comprising:
   capturing a background image by an image capturing unit;
   when the background image is displayed on a display in real-time, generating an augmented reality space corresponding to the background image by an AR running unit according to an augmented reality start command from a user;
   loading an object model selected by the user within the augmented reality space;
   matching, without using absolute size information, an augmented reality coordinate system for the augmented reality space with a model coordinate system for the object model;
   scaling, based on a relative alignment between the augmented reality coordinate system and the model coordinate system, the object model according to the matching result; and
   displaying the scaled object model overlappingly within the augmented reality space,
   wherein the matching the augmented reality coordinate system with the model coordinate system comprises:
   estimating a plurality of first camera locations in the augmented reality coordinate system;
   estimating a plurality of second camera locations corresponding to the plurality of first camera locations in the model coordinate system; and
   calculating a scale factor for the model coordinate system to match the plurality of first camera locations with the plurality of second camera locations, and
   wherein the object model is scaled by applying the scale factor in the scaling the object model.

2. The method of claim 1, wherein the calculating the scale factor is calculating a ratio of a first unit length between the plurality of first camera locations and a second unit length between the plurality of second camera locations as the scale factor.

3. The method of claim 1, wherein the calculating the scale factor comprises:
   calculating a ratio of a length between two among the plurality of first camera locations and a length between two among the plurality of second camera locations as partial scale factors; and
   analyzing a numerical distribution of the partial scale factors and setting an average of a cluster having the largest distribution as the scale factor.

4. The method of claim 1, wherein the first camera location is estimated by SLAM (Simultaneous Localization and Mapping).

5. The method of claim 1, wherein the object model that is a mobile scanned object model being scanned by a camera provided in a mobile device is a 3D model that is generated by a photogrammetry with a plurality of 2D images captured by the camera.

6. An apparatus of implementing an augmented reality using a mobile scanned object model, the apparatus comprising:
   an image capturer, configured for capturing an image that is a background to implement the augmented reality;
   a display, configured for displaying the image captured by the image capturer on a screen in real-time;
   an augmented reality runner, configured for running the image as an augmented reality space according to a user input and loading an object module selected by a user within the augmented reality space; and
   a controller, configured for controlling operation of the image capturer, the display, and the augmented reality runner,
   wherein the object model is a mobile scanned object model that is scanned by a camera provided in a mobile device,
   wherein the augmented reality runner comprises:
   an augmented reality core, configured for managing an augmented reality coordinate system for the augmented reality space; and
   a coordinate matcher, configured for matching, without using absolute size information, a model coordinate system that is included in the object model with the augmented reality coordinate system to scale the object model to correspond to the augmented reality space, and wherein the coordinate matcher estimates a plurality of first camera locations in the augmented reality coordinate system, estimates a plurality of second camera locations corresponding to the plurality of first camera locations in the model coordinate system, calculates a scale factor for the model coordinate system to match the plurality of first camera locations with the plurality of second camera locations, and then scales the object model by applying the scale factor to the object model based on a relative alignment between the augmented reality coordinate system and the model coordinate system.

7. The apparatus of claim 6, wherein the coordinate matcher calculates a ratio of a first unit length between the plurality of first cameral locations and a second unit length between the plurality of second cameral locations as the scale factor.

8. The apparatus of claim 6, wherein the coordinate matcher calculates a ratio of a length between two among the plurality of first cameral locations and a length between two among the plurality of second cameral locations as partial scale factors, analyzes a numerical distribution of the partial scale factors, and sets an average of a cluster having the largest distribution as the scale factor.

9. The apparatus of claim 6, wherein the first camera location is estimated by SLAM (Simultaneous Localization and Mapping).

* * * * *